United States Patent
Nutt et al.

(10) Patent No.: US 12,208,688 B2
(45) Date of Patent: Jan. 28, 2025

(54) DYNAMIC VEHICLE STATE NOTIFICATION AND INFORMATION CONVEYANCE

(71) Applicant: FORD GLOBAL TECHNOLOGIES, LLC, Dearborn, MI (US)

(72) Inventors: David Lloyd Nutt, Monroe, MI (US); Douglas Smith, Farmington Hills, MI (US); Vijay Malik, Novi, MI (US); Richard Moore, Fenton, MI (US); Harshavardhan Chitta, Farmington Hills, MI (US); Claudia Gonzalez, Toluca (MX); Bethany Toups, Sorrento, FL (US)

(73) Assignee: Ford Global Technologies, LLC

( * ) Notice: Subject to any disclaimer, the term of this patent is extended or adjusted under 35 U.S.C. 154(b) by 87 days.

(21) Appl. No.: 17/982,857

(22) Filed: Nov. 8, 2022

(65) Prior Publication Data
US 2024/0149670 A1    May 9, 2024

(51) Int. Cl.
| | |
|---|---|
| B60K 31/18 | (2006.01) |
| B60K 35/00 | (2006.01) |
| B60Q 3/70 | (2017.01) |
| G07C 5/08 | (2006.01) |
| B60K 35/22 | (2024.01) |
| B60K 35/28 | (2024.01) |

(52) U.S. Cl.
CPC ............... *B60K 35/00* (2013.01); *B60Q 3/70* (2017.02); *G07C 5/0825* (2013.01); *B60K 35/22* (2024.01); *B60K 35/28* (2024.01); *B60K 2360/16* (2024.01)

(58) Field of Classification Search
CPC ........ B60K 35/00; B60K 35/22; B60K 35/28; B60K 2360/16; B60Q 3/70; G07C 5/0825
USPC ........................................................ 340/348
See application file for complete search history.

(56) References Cited

U.S. PATENT DOCUMENTS

| | | | |
|---|---|---|---|
| 9,818,088 | B2 | 11/2017 | Penilla et al. |
| 10,358,057 | B2 | 7/2019 | Breed |
| 10,991,159 | B2 * | 4/2021 | Eyler ..................... G06T 17/05 |
| 11,423,340 | B2 * | 8/2022 | Goldman .......... G06Q 10/0631 |
| 2002/0186144 | A1 | 12/2002 | Meunier |
| 2004/0030572 | A1 * | 2/2004 | Campbell .............. G01C 21/26 |
| | | | 705/333 |
| 2008/0255758 | A1 * | 10/2008 | Graham ............. G06Q 10/0833 |
| | | | 701/469 |
| 2009/0083111 | A1 * | 3/2009 | Carr ....................... G06Q 10/06 |
| | | | 705/329 |

(Continued)

FOREIGN PATENT DOCUMENTS

| | | |
|---|---|---|
| CN | 101556710 A | 10/2009 |
| EP | 3388286 A1 | 10/2018 |

*Primary Examiner* — Tai T Nguyen
(74) *Attorney, Agent, or Firm* — Joseph Zane; Brooks Kushman P.C

(57) ABSTRACT

A system receives a vehicle transport instruction for transporting a vehicle. The system instructs display of an indicator related to the transport instruction, using a first vehicle output. Further, the system determines whether a vehicle is in a state designated for alert notification based on at least a transportation error detected by the vehicle and changes at least one of the first vehicle output or a second vehicle output to indicate the transportation error responsive to detection of the transportation error by the vehicle.

20 Claims, 3 Drawing Sheets

(56) References Cited

U.S. PATENT DOCUMENTS

| | | | |
|---|---|---|---|
| 2012/0041675 A1* | 2/2012 | Juliver | G06Q 10/08 |
| | | | 701/465 |
| 2018/0211217 A1* | 7/2018 | Berdinis | G05D 1/0212 |
| 2020/0395627 A1* | 12/2020 | Kilburn | H02J 7/00714 |
| 2022/0135077 A1 | 5/2022 | Moon et al. | |

* cited by examiner

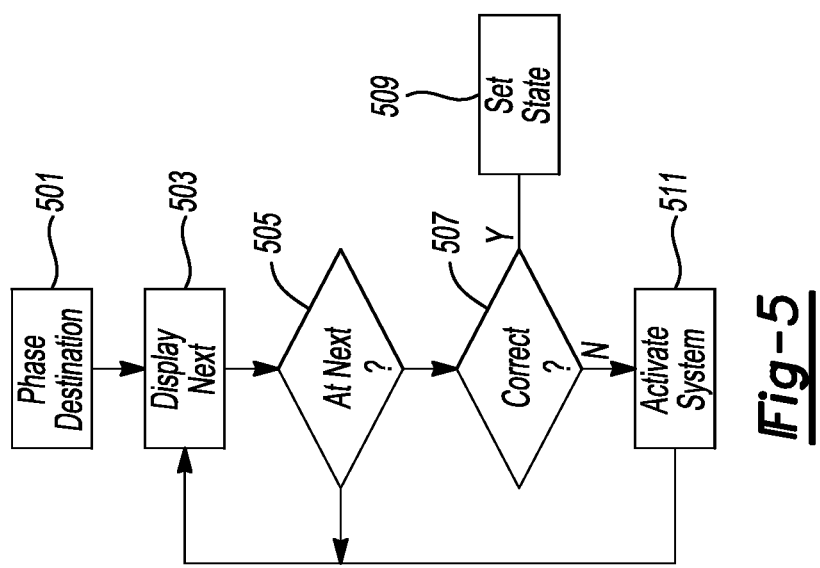
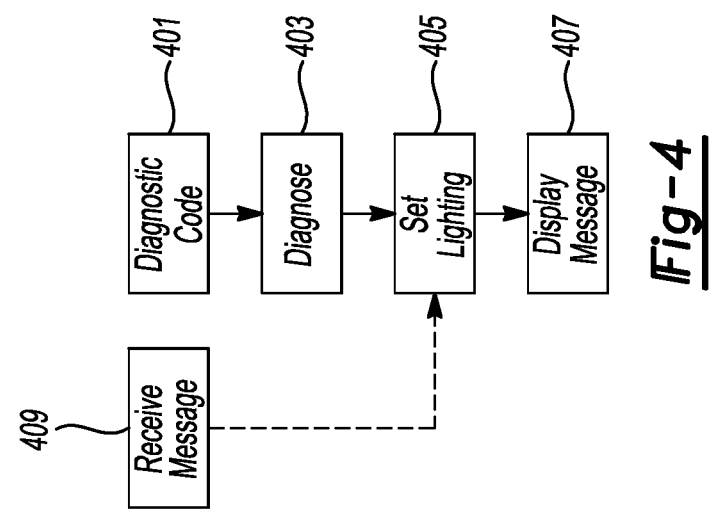
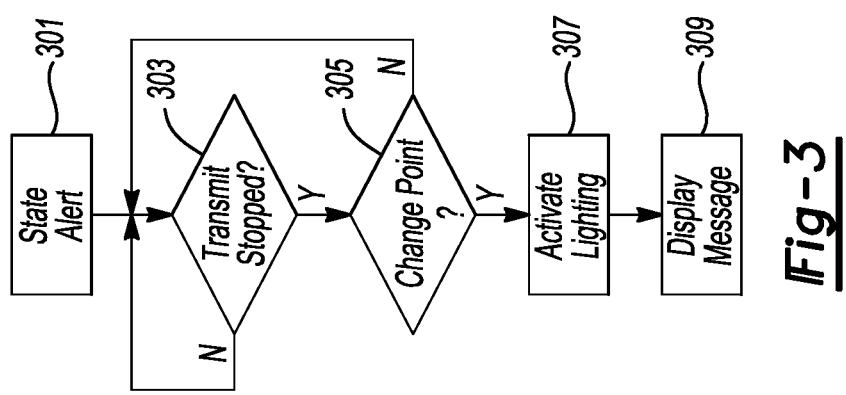

DYNAMIC VEHICLE STATE NOTIFICATION AND INFORMATION CONVEYANCE

TECHNICAL FIELD

The illustrative embodiments relate to methods and apparatuses for dynamic vehicle state notification.

BACKGROUND

Vehicles go through many phases of production and shipping before they reach a dealership lot, and, eventually, a customer. At points along this path, vehicles can be routed to different locations and have specific instructions associated therewith. For example, vehicles undergoing production may be routed to different next-locations in production—the series of process steps are not the same for every vehicle and can vary because of build, model, repairs needed, quality checks, etc. Similarly, in shipment, vehicles may need to be parked in certain specific staging locations and/or loaded onto carriers in specific orders.

Other than model and color, there are not very many significant external markings on a vehicle lacking a license plate, which is the state in which vehicles tend to exist until they reach a dealer and/or are sold. Accordingly, the common methods of identifying vehicles include techniques very similar to affixing a license plate—instructions or identification markings are written directly onto the vehicle itself, such as onto a windshield or an affixed paper tag.

While a relatively cheap system, such markings can become obscured due to environmental effects, and can also result, in certain cases, in marring to the vehicle—such as when an improper marking agent is used to mark a windshield.

More modern techniques may involve using digital identification of vehicles through broadcast signals and with the use of handheld devices, but this requires processing entities to have access to such devices, which can add expense and require training and equipment upkeep. Further, such devices may be effective in one environment, such as manufacturing, but less effective in another environment, such as a shipping yard, where there may be hundreds of vehicles in close proximity broadcasting conflicting signals. In many instances, physically marking the vehicle or affixing a marker is the fastest, cheapest and easiest way to handle conveyance of information related to the vehicle.

SUMMARY

In a first illustrative embodiment, a system includes one or more processors configured to receive a vehicle transport instruction for transporting a vehicle. The one or more processors are also configured to display an indicator related to the transport instruction, using a first vehicle output. Further, the one or more processors are configured to determine whether a vehicle is in a state designated for alert notification based on at least a transportation error detected by the vehicle and change at least one of the first vehicle output or a second vehicle output to indicate the transportation error responsive to detection of the transportation error by the vehicle.

In a second illustrative embodiment, a method includes receiving a vehicle transport instruction for transporting a vehicle. The method also includes displaying an indicator related to the transport instruction, using a first vehicle output. The method further includes determining whether a vehicle is in a state designated for alert notification based on at least a handling error detected by the vehicle based on positioning of the vehicle and using at least one of the first vehicle output or a second vehicle output to visually indicate the handling error responsive to determining that the vehicle is in the state designated for alert notification based on at least the handling error.

In a third illustrative embodiment, a vehicle includes one or more processors configured to receive indication of a vehicle issue predefined as an issue for which owner notification should occur. The one or more processors are also configured to determine a predefined vehicle interior lighting color correlated to the issue and engage vehicle interior lighting to illuminate a vehicle interior in the predefined interior lighting color responsive to indication of the issue.

BRIEF DESCRIPTION OF THE DRAWINGS

FIG. 3 shows an illustrative example of a notification resumption process;

FIG. 4 shows an illustrative example of a dynamic notification process; and

FIG. 5 shows an illustrative example of a production routing process.

DETAILED DESCRIPTION

Figure 1:
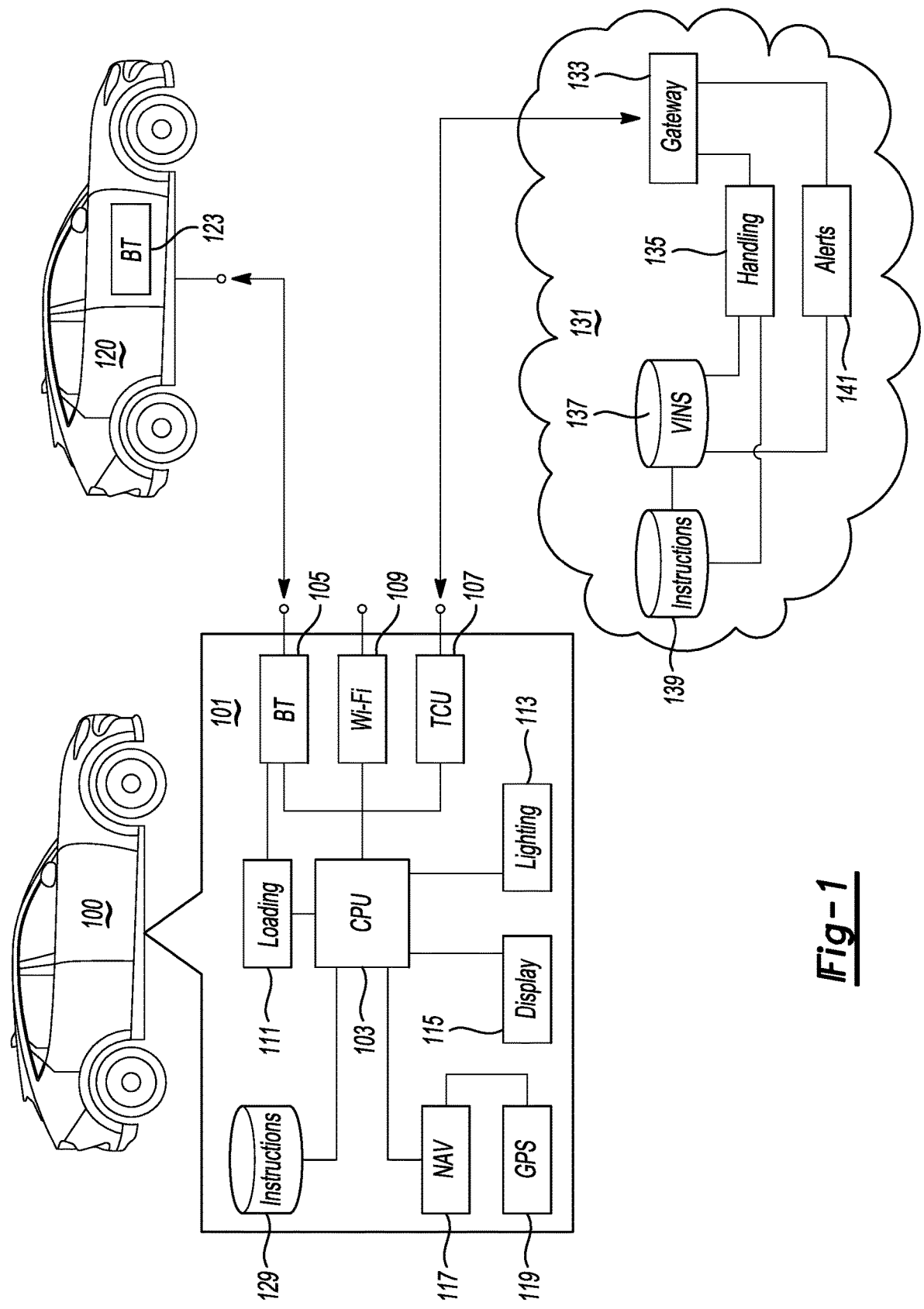
FIG. 1 shows an illustrative example of a dynamic notification system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Recognizing the shortcomings with conventional vehicle marking techniques, the illustrative embodiments propose use of native vehicle systems to provide information conveyance and instructions. Many vehicles come equipped with color-changeable internal LED lighting, large information displays or both. Every vehicle comes with a set of headlamps and other external lighting.

Light and sound are characteristics of a vehicle observable at a distance, and a reasonable way to make a vehicle stand out in a crowd of its peers. Sound, while it may carry past visual obstructions, may provide notice, but it may be difficult to determine the source of the sound. In the illustrative embodiments, it is proposed that vehicles having certain conditional indicators associated therewith provide some form of external notification using native systems. While sound could serve in this capacity, and is a possible solution, it may also be difficult in a lot of five hundred vehicles to determine the source or meaning of a sound when fifty of those vehicles are issuing the same or different sounds at the same time.

While not foreclosing on the strategic use of sound when interference is less of an issue, the illustrative embodiments focus on the use of light as a notification system, and/or the use of vehicle information displays to show more detailed information.

Under the right conditions (limited ambient light), changes to vehicle interior lighting, or even mere activation of vehicle interior lighting, can serve as a visual signal and distinctive characteristic for fast identification of singular vehicles among a group of vehicles. Similarly, activated vehicle lighting (headlamps, brake lights, etc.) can be viewed from certain levels and/or at certain angles to serve a similar function.

For example, in dim conditions, vehicles in a loading pattern may have several displayed coloring characteristics achieved through lighting control. Vehicles correctly parked may be dark, with no message displayed. Vehicles waiting to be positioned (out of parking zones) may have no change to interior lighting, but may have parking instructions displayed on a display thereof. Vehicles incorrectly parked may have both yellow interior lighting enabled and corrected parking instructions displayed on a display. Vehicles with an issue unrelated to parking may have red interior lighting and a display indicating the issue.

In this manner, someone viewing the parking area can, at a glance, identify quickly which vehicles need to be re-parked and which vehicles may have issues requiring some form of maintenance before sale. Operators parking the vehicles can quickly confirm the vehicles were correctly parked by checking for a lighting change to yellow—no change should indicate that the vehicle is parked correctly and they can move to a next vehicle.

Similarly, vehicles may need to be loaded in a certain order, and vehicles can use onboard lighting to indicate what vehicle is to be loaded next, and/or whether proximate vehicles are supposed to be loaded next to each other—that is, a vehicle, once loaded, can store the identification of a preceding or trailing vehicle and can confirm, through vehicle to vehicle (V2V) communication, that it is proximate to a correct vehicle once loaded. Again, a visible change to vehicle interior or exterior lighting, sounding of a vehicle alert and/or display of notification on a vehicle display can serve to identify loading personnel of any identified errors in procedure.

Moreover, use of such native vehicle systems does not increase the expense of the process by requiring additional scanning equipment, or increase the chance of issue during the process by use of physical markings that can be washed off, ruined or that may otherwise mar the vehicle.

In a post-sale environment, vehicle lighting changes can notify customers of vehicle issues before the customer enters the vehicle. This can be done in an unobtrusive manner that does not disturb the neighbors—that is, while a customer could elect to enable an audible alert when a diagnostic code is detected or a vehicle system detects an issue (e.g., low tire pressure), another option is to have the cabin illuminated in a certain color, which can be seen from inside the house or when entering a garage, but which does not bother neighbors or wake sleepers in the house.

Messages on an interior display, when present, can provide more detailed information. When the display is lacking, the vehicle may be able to push messages to an application on a cellular device, which may at least serve a useful function on the consumer side of messaging.

In more basic vehicles with less sophisticated lighting and displays, headlamp and brake light illumination patterns can serve notification functions—for example, one pattern can be used to signal a vehicle that should be parked or loaded next, a same or different pattern from already-parked or already-loaded vehicles can indicate an issue with the chosen parking location or loading order.

Examples will be described with respect to interior illumination colors and patterns and use of vehicle displays. It is appreciated, however, that when appropriate, sound and/or exterior lighting can be used in place of interior lighting, and mobile device application displays can be used in place of vehicle interior displays, as conditions warrant. Certain applications may be less suitable for certain environments, but, on the other hand, limited vehicle capabilities may make less optimal usages (e.g., sound in crowded environment) the only practical choice, if reversion to old-style marking systems is not preferred.

FIG. 1 shows an illustrative example of a dynamic notification system. In this example, a vehicle 100 may be in a pre-production, shipping, or post-shipping state. In certain pre-production stages, the vehicle may not actually include all the noted capabilities, and it will be appreciated that any dynamic notification will be undertaken with comparable existing (i.e., already-installed and functioning) vehicle systems at a stage of production as appropriate. For example, a vehicle may use lighting to indicate an incorrect production routing if lighting is installed, but sound in lieu of lighting or other lighting in lieu of specified lighting if the alternative is installed and functioning and the example system is not.

In this example, a completed vehicle 100 includes an onboard computing system 101 with one or more processors 103. The vehicle may also include a variety of onboard communication channels, such as BLUETOOTH 105, Wi-Fi 107 and a telematics control unit (TCU) 109 including one or more cellular modems. The BLUETOOTH transceiver 105 may be usable for, for example, V2V communication when vehicles cooperate to provide status indications. The cellular modems in the TCU 109 may be used to communicate with a backend cloud 131 to receive updated shipping information and/or alert notifications.

In one example, a vehicle 100 may include a set of information relating to its own shipping instructions 121, which include the routes and plans for transportation for that vehicle from the factory to a dealership. This data can be updated along a route through communication with the vehicle. A loading process 111 can provide state control information for at least a current phase of vehicle shipping. For example, the loading process may store and/or access the parking location or loading order for a vehicle at a given spot along a shipping route. This information can be used in conjunction with lighting 113 and display 115 to indicate the correct location and/or whether any error was detected in loading or parking a vehicle.

In the parking example, vehicle 100 can use navigation 117 and GPS 119 to determine if the vehicle was placed in a correct location. In a loading scenario, the vehicle 100 may have the digital signatures of one or more vehicles that are supposed to be proximate to vehicle 100. Based on received signatures from nearby vehicles 120 broadcast over BLUETOOTH 123, the vehicle 100 can determine if it was loaded in a correct order and use the lights or displays to indicate error. A similar process can be used for parking location determinations if the GPS is unusable due to interference and/or too inaccurate for precise information provision.

It may be possible to provide vehicle 100 with full shipping plans at the onset of a journey, or the plans may be updated dynamically as the journey progresses. The vehicle 100 can communicate with the cloud backend 131, with requests thereto and responses therefrom routed by a gateway process 133. In this example, those may include handling instructions 135 and/or alert instructions 141.

Handling instructions may use cloud-based databases to manage information as to where the vehicle 100 is to be shipped and any pertinent instructions. The vehicles can be identified based on VINs 137, linked to corresponding instructions 139. Changes to shipping plans, parking plans, loading plans, etc. can be populated to the relevant vehicles, where they can be immediately conveyed to on-site personnel. This prevents having to re-mark a vehicle physically and allows for more dynamic replanning. This can also allow for query and identification of a specific vehicle. For example, a shipper may need to know the location of a certain vehicle, which may be located in a large lot, on a ship, on a train, etc. The query can be issued and the vehicle can be instructed to illuminate interior lighting in a certain color. This allows the shipper to quickly identify and locate the vehicle, preventing potentially hours of searching inventory for the vehicle. A similar technique could allow a dealer to quickly locate a vehicle on a dealer lot, and it may even be possible to specify the color in which the vehicle should be internally illuminated.

Figure 2:
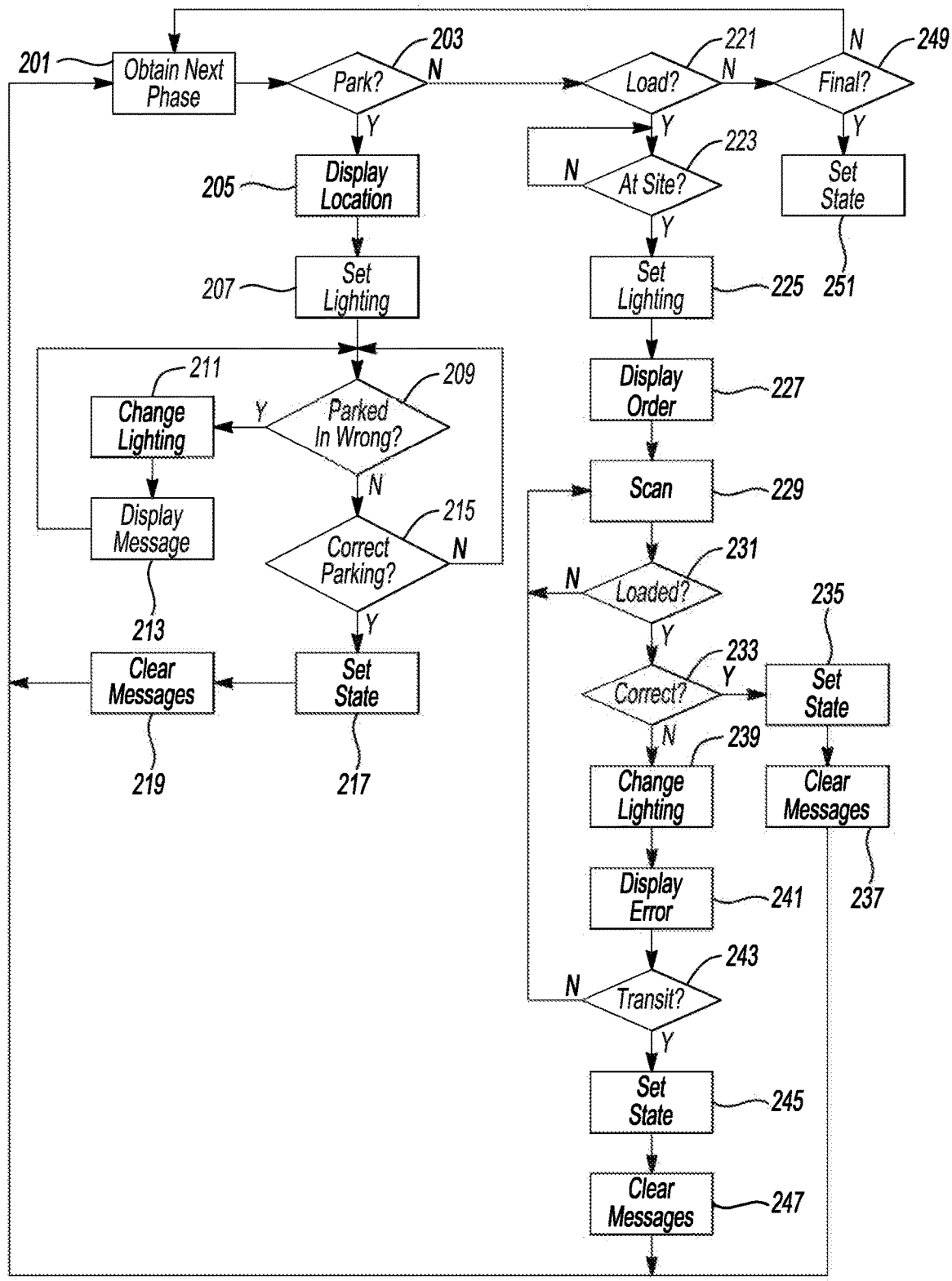
FIG. 2 shows an illustrative example of a delivery handling process.

FIG. 2 shows an illustrative example of a delivery handling process. This process demonstrates use of vehicle native systems for dynamic detection and handling notification processes, although comparable techniques could be used in situations where comparable results are desired, in lieu of older methods such as vehicle marking or ordered parking—for example, in a service center, such as a tire repair shop, a next-up vehicle could be illuminated in a parking lot to provide for faster location for technicians. This could allow for faster parking of queued vehicles (since ordered parking may not be necessary) and faster vehicle-location time, increasing vehicle throughput. Service centers could be provided with limited paging rights obtainable through identification of the service center and vehicle identification number (VIN), for example.

In this example, the process executing onboard the vehicle, or in a remote orchestration server capable of vehicle paging and wakeup, determines a next/current phase for vehicle shipment at 201. This allows the process to determine if the vehicle is to be parked, loaded, etc., or is at a final destination.

For example, if the vehicle 100 requires specific parking locations for a current phase at 203, the process can display parking instructions on an in-vehicle display at 205 and set lighting accordingly at 207, which could be a color associated with a queued (not yet parked) vehicle, or could include no lighting. Based on battery power remaining, power draw from lighting and screen usage, and system life effect, decisions to use lighting and internal screen displays can extend beyond immediate need. A lower power system such as a single cabin light could indicate some state requirement, and as a handler approaches or interacts with a vehicle the lighting could change and/or a display could activate, if power preservation and/or system life preservation were concerns.

In some vehicles, LED headlights may be capable of projecting information on the pavement in front of a vehicle, and those systems could be used as well to convey additional information, which may be useful for preventing having personnel have to walk to the side of a vehicle and view a display. Heads up displays may also be used in such a manner to convey information in a readily ascertainable manner.

In the parking example, for the sake of illustration only, it is assumed that the vehicle uses no particular internal lighting while waiting to be parked (e.g., in a staging area or still on a freight conveyance or factory floor). The display, again, for example, only, displays the parking location where the vehicle should be parked, and this can persist until a handler enters the vehicle and drives it to a location on a lot and places it in park. The lot coordinates, staging coordinates, etc. may be known in advance, as well as parking space coordinates, so it may be possible to track all vehicle locations using GPS. In other instances, low energy BLU- ETOOTH or other beacons can broadcast local signals so a vehicle can detect whether it is in staging or parking.

If the vehicle 100 is parked in the wrong location at 209, the vehicle may engage (or change) interior lighting at 211 and display an alert message at 213. For example, in this instance, the vehicle 100 may illuminate the interior in bright blue when misparked, and display a message such as "MISPARK—Please move vehicle to Space 81J"). A handler would either immediately notice the cabin lighting or may notice it upon exiting the vehicle and looking at the vehicle. If the notification were delayed or the handler did not notice, anyone viewing the lot under dim conditions, if not in full daylight depending on lighting brightness, would immediately notice any vehicles that were misparked, and could take rectifying action.

Misparking may be identified based on a vehicle no being located at (or within proximity to) coordinates corresponding to a given assigned parking space. In a comparable situation, where parking is assigned in a garage, for example, vehicles could illuminate when parked in an incorrect space to assist owners in recognizing their error. This would also have the effect of notifying enforcement, but owners may be willing to voluntarily accept this notification to participate in a given garage program, wherein enforcement of parking spaces would be made much faster by illumination of misparked vehicles.

Vehicles may also know the wireless signatures of one or more vehicles that should be parked in proximity to them, and, at some point subsequent to parking, may be able to use signal strengths and identifications to determine if they are located correctly relative to other known vehicles. This may be useful in situations where GPS is not a reliable indicator of location.

If the vehicle is correctly parked at 215, the process can set the state at 217 as, for example, "parked, waiting" and clear all messages and lighting at 219. The vehicle state can indicate what should happen next, and prevent notifications being triggered that may unnecessarily use up vehicle power. Even a low power situation itself, resulting from, for example, over-notification during a journey, could be indicated by a vehicle illumination—for example, if a battery falls below 20 percent, a certain notification color could be provided indicating that the vehicle may require battery charging.

Similar to the battery situation, various colors can be used at phases to indicate issues unrelated to the phase. For example, blue may be designated as a mispark color, and red may be designated as a vehicle issue color. So, if a vehicle detected a diagnostic trouble code in transit, or if the cloud issued an alert relating to the vehicle (such as bad software or other issues detected in transit), the vehicle 100 could self-illuminate in red and identify the problem on its display. Again, anyone observing a large number of vehicles could quickly and easily identify any vehicles that may have issues affecting ultimate deliverability of the vehicle.

For example, a part manufacturer could indicate that a batch of 100 parts was flawed for some manufacturing error. Before the vehicles were loaded onto a transport ship, the cloud may identify the 100 vehicles through electronic serial numbers associated with the parts, and cause the vehicles to illuminate in red. This can provide a chance to cure the issue prior to shipment of the vehicles to locations where the issues may be more difficult to cure. Alternatively, if cure at the destination was possible, the vehicles could illuminate when unloaded, so they could immediately be identified for sending to a repair facility for rectification before dealer delivery. The timing of a dynamic vehicle notification can be determined onboard the vehicle or by a cloud-based process.

If the vehicle 100 is to be loaded at 221, the process may determine if the vehicle is in a staging or parking area at a loading site 223. It is possible that the organized parking and loading are part and parcel of the same site, but each phase can execute independently—parking phase when the vehicles are being parked, loading phase when the vehicles are being loaded.

If the vehicle is on-site and staging for loading, the process can set the lighting at 225 (which can also include no lighting) and display a load-order on a vehicle display 100. If the vehicles were parked in order of loading and are loaded from the same order, these steps may be skipped if the vehicles are confirmed to be parked in the correct order, to preserve battery and system life. It is also possible that a vehicle that is next to be loaded can be signaled by a vehicle that was just loaded (directly via V2V communication or through the cloud acting as an orchestrator) so that the "next" vehicle can illuminate itself with a color indicating it is supposed to be loaded next.

A vehicle may not know that it is loaded based on coordinates, since the freight option may not have a fixed coordinate location, and so the vehicle 100 may scan intermittently for BLE or other signatures indicating proximately loaded vehicles at 229. When the vehicle is parked and in close proximity to one or more signatures, after a staging point, for example, the vehicle may assume to be loaded at 231. There may be additional techniques to distinguish between intermittent staging parking and loading-parking as well.

If any relevant state indicators indicate that the vehicle 100 is loaded at 231, the process can determine if the load order is correct at 233. This can be determined, for example, by detecting whether expected vehicle signatures of vehicles to be loaded before the present vehicle are detected. Time of Flight or signal strength (or other ranging) can determine the proximity of other detected signals.

If the loading is incorrect in order at 233, the process may modify or engage vehicle lighting (again, using blue as an example) to indicate a misload. The error can be displayed on the screen at 235. The error can include, for example, not detecting at least one other vehicle expected to be detected—e.g., "POSSIBLE MISLOAD—did not detect BLACK EXPLORER 1FASFS5452EA." The handlers can then visually confirm whether the alleged missing vehicle is actually missing, or whether it may be experiencing a communication error preventing identification broadcast to the now-loaded vehicle. The handlers may also be able to quickly look at a staging area to see if a black explorer is interiorly illuminated with the "next load" color, indicating they loaded the wrong vehicle next.

If the conveyance begins transit, determinable, for example, by engagement of accelerometers or GPS movement without engine engagement at 243, the messaging and lighting may be disabled during transit at 247 and the vehicle state may be set to something like "alert when stopped." This allows the vehicle to be transported without draining battery, and when the transportation stops, the vehicle 100 can resume indication of the misload so that it does not get misdirected to an incorrect next or final destination. There is presumably little that can be done while transit is underway, however, and so the vehicle 100 may act to preserve battery life if desired.

If the vehicle is loaded correctly, the state can be set at 235 to "loaded, waiting" and the messages and any illumination may be cleared at 235 until the vehicle 100 reaches a next-location for instruction provision. Again, if any errors are detected or occur during transit, the vehicle can illuminate in an alternative color and provide indication of the issue, and again, this can be delayed, if desired, until the vehicle reaches a location where the problem can actually be addressed. Identification of that location can be movement-based, such as when transportation stops moving for more than X minutes, or can be instructed by a server as location or otherwise based. Depending on the type of transportation, accommodation can be made for movement patterns that are regularly occurring with that transportation type, but which do not necessarily indicate reaching a final destination (e.g., train cars pulling forward 15 feet then stopping again to load a next car).

When the vehicle reaches a final destination at 249, such as a dealer, the process can set a state at 251, such as "final, at dealer," or "final, at customer." This may place the vehicle into an alert paradigm related to dealerships or customer possession, and disable any pending shipping alerts, as those would make little or no sense to an observing customer if inadvertently triggered. Vehicle DTC and other relevant alerts may still be permitted, although different color coding may be used (and may even be dealer or customer customized if desired).

FIG. 3 shows an illustrative example of a notification resumption process. This is an example of when an alert may be delayed or suspended due to the vehicle being in a state where rectification is impractical. That can include, in addition to transit, and by way of non-limiting example, closely parked vehicles that are stacked (determinable by vehicle sensors) wherein a central vehicle cannot be practically reparked.

The vehicle can be set to a state indicating that an alert is present at 301, and have a trigger condition set for when the alert is to be resumed. For the transit example shown, this can be when transit ends at 303. For the parking example, this can be when vehicles blocking movement of the object vehicle are no longer present at least ahead of or behind the vehicle (allowing the vehicle to be pulled forward or backed up). Alerts may also be suspended based on known operational hours of a location, if it does not operate 24 hours a day. Even in a dealership scenario or in a personal use scenario, alerts may be suspended outside of operation hours (for the dealer) and outside of daylight or waking hours (user-specifiable, if desired) for the user, since there is often little a user can do about an issue related to a diagnostic problem if notified at 4 AM. But, for users who prefer, alternative scheduling can be input and/or alert suspension can simply be disabled.

In the transit example, since the predicate is stoppage at 303, the process also determines if the stoppage corresponds to a final destination at 305. This can be determined, for example, based on GPS. If the vehicle is in a shipping hold, and cannot obtain GPS, the mere fact that it cannot obtain GPS may indicate that it is still not "at" the final destination, and it can resume when unloaded. Alternatively, if there is no available GPS signal, but the movement stops for more than a threshold time, the vehicle may enter a periodic alert state until a GPS signal can be resolved—e.g., it can signal an alert for 1 minute out of 10, for example. When the alert state is resumed at 305, the vehicle 100 can activate the correct lighting color at 307 and display any relevant messages at 309.

FIG. 4 shows an illustrative example of a dynamic notification process. In this example, a user or dealer may be notified of a vehicle condition based on the occurrence of a diagnostic trouble code at 401 or other vehicle detection of an issue. The vehicle 100 will diagnose the problem to determine an appropriate output message and lighting color. For example, problems that do not render a vehicle undrivable, such as a minor loss in tire pressure, may result in a light yellow interior color at 405. Problems that render the vehicle undrivable, such as an urgent recall or a completely flat tire, may result in a bright red vehicle color. This helps ensure that an approaching driver may notice the color and recognize the issue. The vehicle can also display a message at 407, based on the criticality of the alert and the necessity for immediate action or inaction. In an alternative example, a comparable process can be triggered through issuance of a message from a manufacturer or dealer at 409, wirelessly received by the vehicle 100.

The vehicle may be configured to display the color notification even when the vehicle is unoccupied and powered down, such as when the vehicle is parked in a driveway or garage and the engine has not been engaged. In some instances, the vehicle may be prohibited from engaging the lighting based on context—for example, it may be determined that it is improper to engage the lighting when a driver is traveling at certain speeds in dark environments to prevent sudden changes to cabin lighting. In other instances, the change may be more subtle under such context, so that the vehicle will softly glow in a noticeable, but not overwhelming, color, responsive to the indication of issue. In still further examples, the vehicle may wait until the vehicle is parked or stopped moving, if a lighting change responsive to an issue is generated while a vehicle is occupied or driving.

FIG. 5 shows an illustrative example of a production routing process. Production is another instance where vehicles may have temporary routing instructions provided thereto, based on feature set and testing designation, for example. Since these vehicles are often incomplete, any alerts using native systems may have the alert-type selected and activated based on what systems are actually presently installed and functional. Additional information may be stored at a central computer record and accessible through a lookup of a vehicle for which an alert is indicated.

In the example shown, a vehicle receives or has a designated next-phase of production destination assigned at 501. To the extent possible, the vehicle uses an active installed display to show information related to this phase at 503. Additionally or alternatively, a main data record for the vehicle will show the phase designation when the vehicle is looked up in a database.

If the vehicle has not reached a point in production where a next phase will occur (correct or otherwise) at 505, the process waits. Once the vehicle 100 reaches a next-phase (e.g., where the next set of parts are installed or testing is to occur), the process may determined based on the assigned phase whether the vehicle 100 is at the correct phase at 507.

If the phase is incorrect, the vehicle 100 may issue a visual or audible alert at 511, to alert personnel that the phase that is about to be undertaken is not the designated phase for this vehicle 100. Otherwise, the vehicle 100 can set a state at 509 to, for example, "at next phase, awaiting new designation" and disable any present notifications until, for example, either an error occurs or a new phase is designated.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
one or more processors configured to:
receive a vehicle transport instruction for transporting the vehicle;
instruct display of an indicator related to the transport instruction, using a first vehicle output of the vehicle;
determine whether the vehicle is in a state designated for alert notification based on at least a transportation error detected by the vehicle; and
change at least one of the first vehicle output or a second vehicle output of the vehicle to indicate the transportation error responsive to detection of the transportation error by the vehicle.

2. The system of claim 1, wherein the indicator includes language-based instructions and the first vehicle output includes a display of the vehicle.

3. The system of claim 1, wherein the indicator includes visual color indication and the first vehicle output includes color changeable interior vehicle lighting.

4. The system of claim 1, wherein the state includes a misparked vehicle during transit, determined based on a vehicle parked location not corresponding to a designated parking location for the vehicle, wherein the first vehicle output or the second vehicle output includes color changeable vehicle lighting, and wherein the change includes changing the color changeable vehicle lighting to a color predesignated for a misparked vehicle.

5. The system of claim 4, wherein the vehicle parked location is determined not to correspond to the designated location based on coordinates of the vehicle compared to coordinates of the designated location.

6. The system of claim 1, wherein the state includes a misloaded vehicle during transit, determined based on an expected wireless signature associated with a predetermined expected prior loaded vehicle not being detected by the vehicle, wherein the first vehicle output or the second vehicle output includes color changeable vehicle lighting, and wherein the change includes changing the color changeable vehicle lighting to a color predesignated for a misloaded vehicle.

7. The system of claim 1, wherein the one or more processors are further configured to determine whether the vehicle is in a state designated for alert notification based on at least a vehicle error, wherein the state indicates a diagnostic trouble code detected by the vehicle, wherein the first vehicle output or the second vehicle output includes color changeable vehicle lighting, and wherein the change includes changing the color changeable vehicle lighting to a color predefined for diagnostic issues.

8. The system of claim 1, wherein the one or more processors are further configured to determine whether the vehicle is in a state designated for alert notification based on at least a vehicle error, wherein the state indicates an alert wirelessly issued to the vehicle by a manufacturer, wherein the first vehicle output or the second vehicle output includes color changeable vehicle lighting, and wherein the change includes changing the color changeable vehicle lighting to a color predefined for wirelessly issued alerts.

9. The system of claim 1, wherein the first vehicle output or the second vehicle output includes a display and wherein the change includes presenting text indicating at least one of the state or an advised rectification for the state.

10. A method comprising:
receiving, at a vehicle, a vehicle transport instruction for transporting the vehicle;
displaying an indicator related to the transport instruction, using a first vehicle output of the vehicle;
determining, using a vehicle computing system, whether the vehicle is in a state designated for alert notification based on at least a handling error detected by the vehicle based on positioning of the vehicle; and
using at least one of the first vehicle output or a second vehicle output of the vehicle to visually indicate the handling error responsive to determining that the vehicle is in the state designated for alert notification based on at least the handling error.

11. The method of claim 10, wherein the indicator includes language-based instructions and the first vehicle output includes a display of the vehicle.

12. The method of claim 10, wherein the indicator includes visual color indication and the first vehicle output includes color changeable interior vehicle lighting.

13. The method of claim 10, wherein the state includes a misparked vehicle during transit, determined based on a vehicle parked location not corresponding to a designated parking location for the vehicle, wherein the first vehicle output or the second vehicle output includes color changeable vehicle lighting, and wherein the visual indication includes changing the color changeable vehicle lighting to a color predesignated for a misparked vehicle.

14. The method of claim 13, wherein the vehicle parked location is determined not to correspond to the designated location based on coordinates of the vehicle compared to coordinates of the designated location.

15. The method of claim 10, wherein the state includes a misloaded vehicle during transit, determined based on an expected wireless signature associated with a predetermined expected prior loaded vehicle not being detected by the vehicle, wherein the first vehicle output or the second vehicle output includes color changeable vehicle lighting, and wherein the visual indication includes changing the color changeable vehicle lighting to a color predesignated for a misloaded vehicle.

16. The method of claim 10, wherein the visual indication includes presenting text indicating an advised rectification for the state.

17. The method of claim 10, further comprising:
determining whether the vehicle is in a state designated for alert notification based on at least a diagnostic trouble code detected by the vehicle; and
using the second vehicle output, comprising color changeable vehicle lighting, to visually indicate a vehicle diagnostic trouble code being present by displaying a predefined color for diagnostic issues responsive to determining that the vehicle is in the state designated for alert notification based on at least detection of the diagnostic trouble code.

18. A vehicle comprising:

one or more processors configured to:

receive indication of a vehicle issue predefined as an issue for which owner notification should occur;

determine a predefined vehicle interior lighting color correlated to the issue; and engage vehicle interior lighting to illuminate a vehicle interior in the predefined interior lighting color responsive to indication of the issue.

19. The vehicle of claim 18, wherein the vehicle is in at least one of a parked state or a state wherein the vehicle engine is not powered.

20. The vehicle of claim 18, wherein indication of the vehicle issue includes at least one of detection of a diagnostic trouble code by the vehicle or wireless receipt by the vehicle of an alert notification from a vehicle manufacturer.

\* \* \* \* \*